United States Patent Office 2,888,855
Patented June 2, 1959

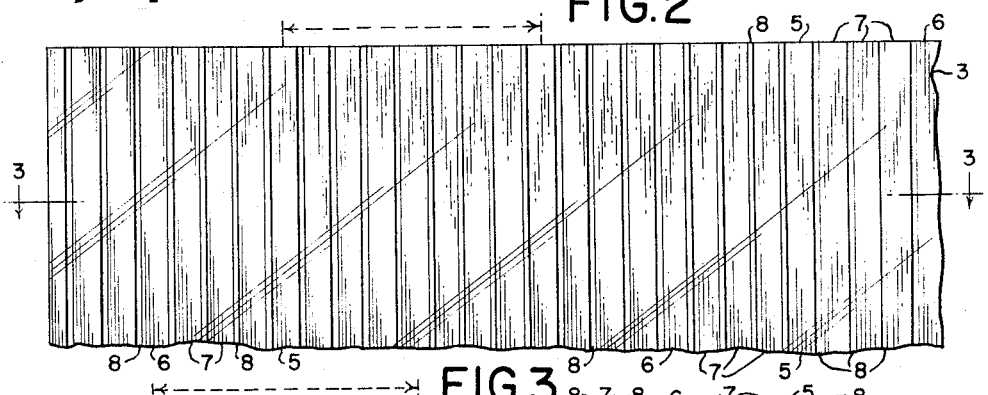
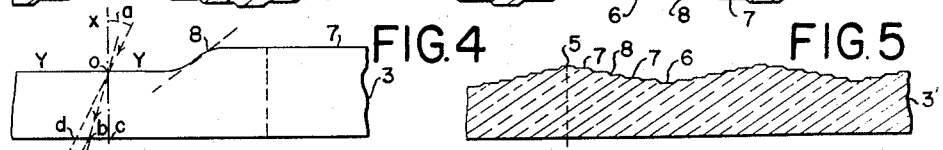
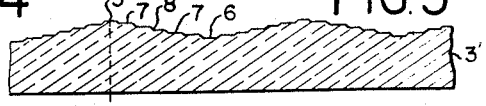
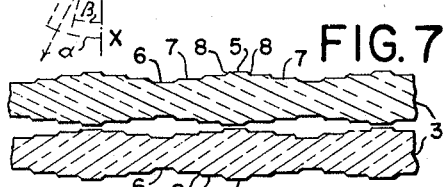
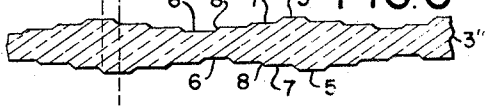
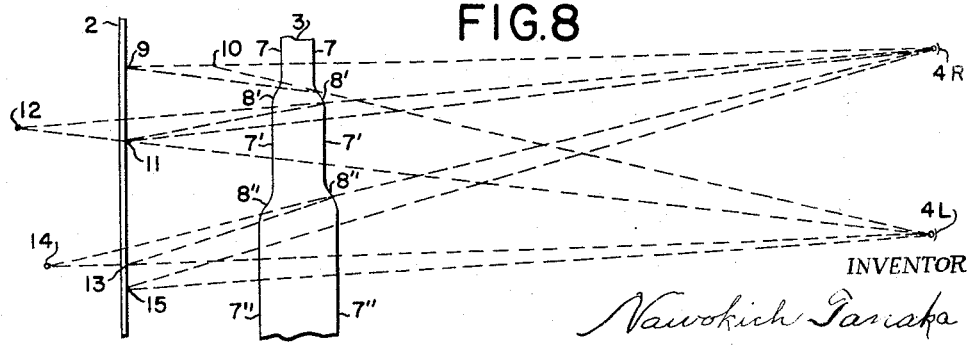

2,888,855

MEANS FOR PRESENTING PICTURES IN THREE DIMENSIONAL EFFECT

Nawokich Tanaka, New York, N.Y.

Application August 23, 1956, Serial No. 605,754

4 Claims. (Cl. 88—1)

This invention relates to a refractor of light for presenting pictures in three dimensional effect, whereby photographic pictures of three dimensional objects or scenes or certain other perspective pictures are rendered perceptible with the third dimensional effect, without recourse to segregative eyepieces or to the coordination of stereoscopically related left and right eye views.

Although the present invention functions with a single ordinary picture or a single series of sequence pictures, as the above statement implies, the effect perceptible therethrough distinctly differs from so-called pseudo stereoscopic effect in a single picture. Though incredible it may appear to those antipathetic to new ideas founded on a principle other than the traditional stereoscopic principle, the three dimensional effect perceptible through this device can be good perceptive imitation of the natural effect in generic viewing, depending upon the quality of pictures. The prominence of depth perception in this case is variable with the spacing distance to a picture, the greater the distance the more the prominence. However, the practical limitation of the extent is dependent upon the correct construction of apparatus in ensuring the clear transmission of images.

Because of the newness of the principle on which this invention resides, it may be helpful for understanding it to know in advance more fully what can be expected in three dimensional perception through the invention.

In our daily life, our eyes usually perceive things around us in a generic way, viewing everything generally with nothing in particular, until some objects catch our attention inducing the eyes to fixate binocularly on the objects. However, the binocular fixation of eyes requires certain effort of the ocular sensory organs, and therefore the binocular viewing has an endurance limitation. To avoid eventual strain the eyes naturally and often unwittingly shift their viewing mode, whenever allowed, to a less taxing way of viewing, that is generic way. Thus more often than not we view things within the sight scope of both eyes in a generic way. In generic viewing things do not appear so sharply as in stereoscopic viewing, but are perceived in somewhat softened appearance, due to the tendency of eyes perceiving shadow-like secondary images, particularly in close viewing when the eyes are at the brink of seeing the same.

Subtracting the above mentioned tendency from natural perception in generic viewing, one could visualize probable perception of simulated three dimensional effect through the present device, provided that a picture is viewed at an appropriate distance. When a picture is viewed too closely, a counter part to the secondary images in natural viewing may be perceptible.

It may not be superfluous to review briefly the existing three dimensional picture devices in a way of comparison.

As far as I am aware, parallactic stereoscopic devices are only means at present capable to make viewers perceive three dimensional effect in a picture without resorting to segregative eyepieces. Unfortunately, the nature of these devices imposes limitations on the scope of viewing distance and of ground coverage, particularly in the depth-wise direction. In the rest of stereoscopic devices requiring segregative eyepieces, the stereoscopic fixation of eyes is made simultaneously and universally on all objects in the fore and backgrounds of a scene, while in viewing a natural scene eyes can not simultaneously fixate on all objects at various distances in the scene. Hence, the mental reaction of viewers to the three dimensional perception cannot be the same in both cases.

The generic object of this invention is to provide a simple efficient means for presenting photographic or other perspective pictures in three dimensional effect.

An object is to provide a medium for rendering ordinary pictures or well executed paintings in frames, or on walls or as sceneries, appear with the third dimensional effect.

Another object is to provide means through which pictures on a video tube or on a motion picture screen are shown in three dimensional effect.

A feature of this invention is the employment of one or more refractive sheets, having rows of furrows indented thereon, each side of the furrows being terraced and thereby provided with series of plane surfaced strips for collectively transmitting practically continuous main images of a picture, and oppositely refractive series of curved slopes of slim front for collectively transmitting interrupted secondary images of the picture much less impressive to viewing eyes.

Another feature is the use of numerous curved slopes of almost indiscernibly narrow front or indented refractive surfaces, still to have a sufficiently large refractive curved surface thereon for each pitch of the indentation, with oppositely refractive series of individually curved slopes separately grouped, and the employment of plane strip parts with much wider front spacing the curved slopes.

With the above and other objects in view, this invention comprises certain detail of construction and arrangement of parts, as will be hereinafter more fully described, illustrated and claimed, the reference being had in the accompanying drawings which form a part of this specification.

In the drawings,

Fig. 1 is a plan diagram of a picture presenting system, involving this invention;

Fig. 2 is an enlarged front view of part of a refractor, embodying the invention;

Fig. 3 shows a sectional view of the above embodiment similarly magnified, taken along line 3—3;

Fig. 4 depicts the profile of a curved slope with adjoining plane parts appearing in Figs. 2 and 3, and also explains the refraction of light through parallel surfaces;

Fig. 5 illustrates a refractor with only one surface indented, embodying the invention;

Fig. 6 is a sectional view of a refractor with both surfaces indented in offset relation, functionally equivalent to the refractor of Fig. 5;

Fig. 7 represents the combination of two or more sheets indented as in Figs. 2 and 3 for augmenting the effect; and Fig. 8 graphically explains the optical action of the present device, and reactions of viewing eyes thereto.

Similar numerals designate similar or corresponding parts throughout the views.

Referring to Fig. 1, in front of a picture or picture carrier 2, a refractor 3 embodying this invention is located distance 2 - - 3 apart. This distance is herein termed "prerefraction distance," as it is the minimum distance light has to travel from the picture before refraction at the refractor. The picture is viewed through the refractor by the right eye 4R and left eye 4L. Distance 2—4 is named "viewing distance" for obvious reason.

Since the prominence of depth effect perceptible through the present device varies with the prerefraction distance especially and with viewing distance to some extent, these should be taken into consideration in designing the apparatus in order to obtain the best or even tolerably good result. To be more specific, the refractor should be so designed as to be effectively operative at a given prerefraction distance, or the prerefraction distance should be adjusted to suit the structural conditions of a given refractor for acceptable prominence of depth perception at an appropriate viewing distance.

In Figs. 2 and 3, a refractor 3 is moulded of suitable transparent material, such as glass, acrylic plastics or the like.

In this instance, both front and back surfaces are similarly indented, each to have a row of furrows interposed by plane ridges 5 in a form of ridge-furrow stripes of predetermined pitches indicated by arrows. The pitches may be chosen one half of the interpupillary distance as a criterion for a medium viewing distance. The word "pitch" is herein employed as an expression of the shortest distance between two consecutive corresponding parts of a surface having recurrent contours.

Both sides of each furrow are plurally terraced to provide plane strip parts and curved slopes as many as desired. The plane strip parts include ridges 5, furrow bottoms 6 and terrace tops 7, 7, and are on successively different levels, all in parallel to each other. The plane strip parts on both surfaces of the refractor are substantially in parallel to the refractor body. Slopes 8, 8 are curved and tangentially joined to the adjoining plane strip parts which serve as spacers to the former (see Fig. 4) to have smooth refractive surfaces. Fig. 4 shows the sectional profile of a curved slope 8 greatly magnified, more in the direction of the drop.

The primary aim of the above structure is to provide slopes with slim front as fine as required for reducing the discernibility thereof to tolerable degree, without sacrificing the working area of refractive surface for effective function within each pitch of ridge-furrow stripes, the division of plane refractive surface into strips on successive levels being incidental for spacing the slopes.

All slopes in a series on each side of ferrows are conditioned: (1) The refractive surface of each slope must necessarily be independently curved to refract light rays in divergent directions individually covering sufficiently large arc of viewing position. (2) All slopes in a series should be refractive toward the same direction. (3) The front of each slope should be narrow enough to be tolerably inconspicuous to eyes at a given minimum viewing distance. (4) The level drop of each slope should be short in accord with the front to avoid too steep refractive surface.

To ensure the transmission of clear images of a picture much larger area of refractive surfaces should be allotted to plane strip parts than to slope fronts, as slopes occurring too closely together may be a cause of misty images.

As is seen in the views, there are on either surface two groups of functionally opposite stripes, one comprising the indented stripes on the left sides of furrows for collectively transmitting rightwardly displaced images and the other including those on the right sides for collectively transmitting leftwardly displaced images.

I insert the following example to give an idea as to suitable dimensions of parts pertinent to construction of the device, though not as the best, for medium viewing distances, while this invention is effectively operative within wide ranges of dimensions, varying with the purposes of its employments:

Width of plane strip, any of 5, 7 and 6 ___inches__ .055
Frontage of slope 8 _____do____ .020
Drop of slope 8 _____do____ .0015
Number of terraces on either side of furrow _____ 10

From the above, the pitch of ridge-furrow contour which is 1.5", and the depth of furrow depression which is .015" can be found.

By limiting the frontal area of the curved slopes to slim strips, any noticeable distortion due to the curved surface, if present, will be localized within the narrow front of each slope, while hardly discernible distortion of images takes place through the plane strip parts of both surfaces, as will be mathematically explained in the subsequent paragraphs. With the structure as described, the virtually continuous main images of a picture are transmitted collectively as a whole through the parallel plane parts of both surfaces, and shadow-like secondary images, discernible or not, are transmitted individually through each slope.

Referring to Fig. 4, light rays incident on one of the parallel surfaces of a transparent sheet emerge at the other surface without altering the original direction, but on a more or less shifted path depending upon the incident angle. This displacement of path can be determined by formula $$\delta (\tan \alpha - \tan \beta)$$

in which $\delta$ represents the thickness of the sheet; $\alpha$, incident angle; and $\beta$, post-refraction angle in the sheet having refractive index $\gamma$. The latter angle is found from refraction law $\sin \alpha = \gamma \sin \beta$, the incident angle being known.

The derivation of the formula may be easily understood from the diagram in Fig. 4, in which the dash-dash line indicates the path of light. X—X and Y—Y are the axes respectively of abscissa and ordinate.

Displacement $d--b = (d--c) - (b--c) = (o--c)$ $(\tan \alpha - \tan \beta)$ $o--c$ being the thickness $\delta$ of the refractive body.

Two parallel beams of light propagating through parallel surfaces of a transparent sheet with parts of unequal thickness, the difference of displacements of emerged beams through these parts will be $$\Delta (\tan \alpha - \tan \beta)$$

$\Delta$ denoting the difference of the thicknesses at the parts. In the case of the present refractor, the maximum difference of thicknesses is equal to the maximum depth of a furrow, when the refractor has only one surface indented as in Fig. 5, or to the sum of the maximum depths of furrows on the opposite surfaces, when both surfaces indented as in Fig. 3.

Starting from direct frontal viewing with no displacement of image, when the obliquity angle of viewing is zero, the difference of displacement increases with the increase of the angle. At 30 degree obliquity angle, for an instance, with 1.5 given as the refractive index of the refractor, the difference of displacements of the beams will be $$\Delta (\tan 30° - \tan 19°28') = .224\Delta$$

Let the maximum depth of a furrow be .015". Then, the difference of displacements will be .00336". For double indentations it will be .00672". This difference results to lateral enlargement at one half pitch and shrinkage at the other half by that amount. 1.5" as the pitch, these amount to less than ¼ and ½ of one percent respectively.

For comparison, the shrinkage of image of a flat picture in direct oblique viewing is expressed by $1 - \cos \alpha$, $\alpha$ representing the obliquity angle, and is about thirteen percent at 30 degree obliquity angle.

The distortion of image due to the difference of thickness as described is ignorably trivial to be discernable to eyes as the furrows are shallow, and therefore the transmitted images through my refractor could be regarded as distortionless, a far as the plane strip parts are concerned.

In cases where a large prerefraction distance is permissible, a refractor having only one surface indented may be used. In Fig. 5, such refractor provided with a larger number of slopes and plane strip parts of smaller dimensions is shown.

In Fig. 6 a refractor has both surfaces indented, with ridges 5 and furrow bottoms 6 on the two surfaces somewhat out of alignment. The combination of these indentations is an equivalence of that in Fig. 5, as a comparison of variation of thickness will explain. The sectional views in Figs. 5 and 6 are shown enlarged in the thickness-wise direction in particular.

It may be desirable or required to have prerefraction distance restricted to a few inches in practical application, and a single refractor sheet may be found to be insufficient for proper function. In such case, the combination of two or more refractor sheets may be employed. In Fig. 7, such a combination is illustrated consisting of two refractor sheets shown in Figs. 2 and 3, the four refractive surfaces being superposed with the indentations thereon substantially in alignment, so that slopes refractive toward the same direction are grouped in cooperative positions.

In Fig. 8, the optical function of my refractor in creating extra intersections of visual lines in front of and behind a picture in addition to intersections on the picture is graphically shown. This depiction is also intended for any other fragmental part, or the refractor as a whole.

In this view, refractions at plane parts are ignored to avoid confusion of visual lines.

(1) Starting at the top, a small area of picture 2 at point 9 is visible to eye 4R straight through plane parts 7, 7, while eye 4L perceives the same area through refractions at slopes 8', 8'. Visual lines 4R – – 7 – – 9 and 4L – – 8' – – 10 intersect at point 10 in front of the picture. This and such intersections of visual lines create an aerial image which is overshadowed by the other images.

(2) A small area at point 11 is visible to both eyes through plane parts 7', 7', and it is also perceptible to eye 4R through refractions at slopes 8', 8', causing double intersections of visual lines at points 11 and 12 on and behind the picture. These double images are perceptible only to eye 4R, while eye 4L sees the area at approximately true position. The images perceptible through the slopes are the component parts of secondary images as previously referred to, and may be perceived as separate line images or as extensions of the main images. To make these secondary images at least practically indiscernible at appropriate viewing distance is one of the aims of this invention, as described before. At the outset of this specification I have brought to attention an analogous phenomenon in generic viewing of a natural scene, namely the tendency of eyes perceiving secondary images, if not actually perceive them, when the eyes are not stereoscopically fixated on particular objects.

(3) A small area at point 13 is visible to eye 4L straight through plane strip parts 7'', 7'', and meantime eye 4R perceives the same area via slope 8''. Visual lines 4L – – 13 – – 14 and 4R – – 8'' – – 14 intersect at point 14 behind the picture.

(4) Another small area at point 15 appears to both eyes through plane strip parts 7'', 7'', the intersection of visual lines taking place approximately at point 15, the true position.

In the view, the illustration is limited to only a portion of a furrow, but it is easy to understand that similar optical actions are simultaneously taking place at the opposite side of the furrow, with all visual lines reversed in relation to the eyes, and that all other furrows on the same refractor function similarly and simultaneously.

Other countless multitude of visual lines are meanwhile meeting at various points on, behind and in front of the picture for all other small areas of the picture in similar or somewhat modified manner. The multitude of intersections of visual lines thus taking place impress the ocular sensory organs of viewers as indicative of the positions individually of all small areas, collectively in appropriate relation, giving rise to the perception of depth.

With wide plane strip parts and slopes of narrow front, the probabilities are that greater or possibly entire part of the picture will be visible to one or both eyes through plane strip parts only. This gives stability to transmitted images, with weaker images perceived through slim slopes dominated thereby.

From the foregoing description taken in connection with the accompanying drawings, the construction and arrangement of parts will be readily apparent to those skilled in the art to which this invention appertains, and while I have herein shown and described my invention, as I now thought to be the best embodiments of the invention, I may make such changes or modifications, when desired, as to fall within the scope of the invention as claimed.

Having thus described my invention, what I claim as new is:

1. A refractor for presenting pictures therethrough in three dimensional effect, comprising at least one indented surface of substantially uniform sections composed of segments from a first refractive series of segments of positive slope alternating with segments of a second refractive series of segments of negative slope, each segment in both series containing a plurality of spaced plane strip parts substantially in parallel to the refractor body and individually curved slopes between said strip parts, the curved slopes of the segments in one of said series inclining down toward one edge and the curved slopes of the segments in the other series inclining down toward the opposite edge of the refractor, all of said strip parts collectively constituting a virtually continuous surface for transmitting main images of a picture and the curved slopes in the two series providing oppositely refractive broken surfaces for independently transmitting secondary images of the same picture.

2. A refractor for presenting pictures therethrough in three dimensional effect, comprising a substantially uniform indented surface of alternate segments from a first refractive series of segments of positive slope alternating with segments of a second refractive series of segments of negative slope, each segment in both series containing a plurality of closely spaced strip parts substantially in parallel to the refractor body and individually curved slopes between said strip parts, the curved slopes of segments in one of said series inclining down toward one edge and the curved slopes in the other series inclining down toward the opposite edge of the refractor, all of said strip parts collectively constituting a virtually continuous surface for transmitting the main images of a picture and the curved slopes in the two series providing oppositely refractive broken surfaces for independently transmitting secondary images of the same picture.

3. A light ray refractor for presenting pictures therethrough in three dimensional effect, comprising a transparent plate having a plurality of alternately arranged parallel ridges and depressions on at least one surface of said plate, the plate having a cross-section of substantially uniform combinations of said ridges and depressions in a plane perpendicular to said ridges and depressions forming a generally uniform nearly wave shaped contour, a multitude of short substantially straight steps set substantially in parallel to one another and to the length of said cross-section and superimposed on said wave shape, and curved segments connecting opposite ends of said steps to conform to said wave shape, whereby the straight steps form a virtually continuous surface for transmitting principal images of the picture presented by said refractor and the curved segments form refracting surfaces for transmitting auxiliary images of the same picture at different angles of refraction.

4. A light ray refractor for presenting pictures therethrough in three dimensional effect, comprising a transparent plate having a multiplicity of alternately arranged parallel ridges and depressions on at least one surface of said plate, the plate having a substantially uniform cross-section in a plane perpendicular to said ridges and depressions, said ridges and depressions forming at an edge of said cross-section a generally uniform wave shaped contour, a multitude of mutually parallel short straight steps set substantially parallel to the length of said edge and superimposed on said wave shape, and curved segments connecting opposite ends of said steps to conform to said wave shape, whereby the straight steps form a virtually continuous plane surface for transmitting the principal images of the pictures presented by said refractor and the curved segments form refractive surfaces for transmitting auxiliary images of the same pictures at different angles of refraction.

References Cited in the file of this patent

UNITED STATES PATENTS

| | | |
|---|---|---|
| 1,358,685 | Friedman | Nov. 9, 1920 |
| 2,268,351 | Tanaka | Dec. 30, 1941 |
| 2,351,034 | Gabor | June 13, 1944 |
| 2,386,075 | Tanaka | Oct. 2, 1945 |

FOREIGN PATENTS

| | | |
|---|---|---|
| 1,101,550 | France | Apr. 20, 1955 |